United States Patent [19]

Saotome

[11] Patent Number: 4,841,147

[45] Date of Patent: Jun. 20, 1989

[54] IMAGE READ-OUT AND RECORDING APPARATUS

[75] Inventor: Shigeru Saotome, Kanagawa, Japan

[73] Assignee: Fuji Photo Film Co., Ltd., Kanagawa, Japan

[21] Appl. No.: 67,854

[22] Filed: Jun. 30, 1987

[30] Foreign Application Priority Data

Jun. 30, 1986 [JP] Japan ................................ 61-153566

[51] Int. Cl.$^4$ ........................ G01N 23/04; H04N 1/04
[52] U.S. Cl. .................................. 250/327.2; 358/302
[58] Field of Search .......................... 250/327.2, 484.1; 358/302, 300

[56] References Cited

U.S. PATENT DOCUMENTS

| 3,465,352 | 9/1969 | Carlson et al. | 346/108 |
| 4,015,081 | 3/1977 | Starkweather | 358/302 |
| 4,719,515 | 1/1988 | Miyagawa et al. | 358/208 |

FOREIGN PATENT DOCUMENTS

| 101831 | 6/1982 | Japan | 250/327.2 |
| 1124938 | 6/1986 | Japan | 250/327.2 |

Primary Examiner—Carolyn E. Fields
Attorney, Agent, or Firm—Sughrue, Mion, Zinn, Macpeak & Seas

[57] ABSTRACT

An image read-out and recording apparatus comprises a device for splitting a light beam into a read-out beam and a recording beam, a common light deflector for deflecting the read-out beam and the recording beam, and a read-out sub-scanning device for moving an image original exposed to the deflected read-out beam with respect to the light deflector at an angle with respect to a direction of main scanning effected by deflection. A light detection system is provided for photoelectrically detecting light reflected by the image original, light passing through the image original, or light emitted by the image original when the image original is exposed to the read-out beam, and generating image signals representing an image recorded on the image original. The apparatus also comprises a modulator for modulating the recording beam with the image signals, and a recording sub-scanning device for moving a photosensitive material exposed to the deflected recording beam with respect to the light deflector at an angle with respect to the main scanning direction. A synchronizing signal representing a scanning position of the read-out beam on the image original with respect to the main scanning direction is provided by detecting an additional beam formed by splitting the deflected read-out beam.

4 Claims, 1 Drawing Sheet

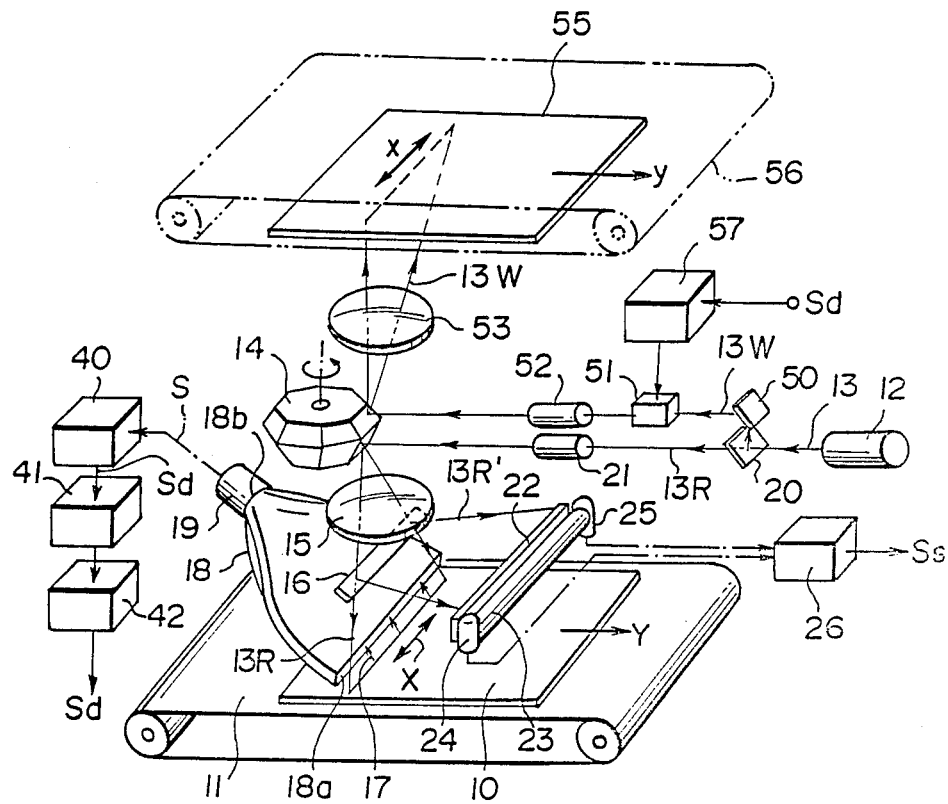

IMAGE READ-OUT AND RECORDING APPARATUS

BACKGROUND OF THE INVENTION

1. Field of the Invention

This invention relates to an image read-out and recording apparatus for reading out an image recorded on an image original and recording the read-out image on a photosensitive material.

2. Description of the Prior Art

Various light beam scanning read-out apparatuses have heretofore been proposed for scanning an image original carrying an image recorded thereon with a light beam, and photoelectrically detecting light reflected by the image original, light passing through the image original, or light emitted by the image original, thereby to read out the image recorded on the image original. There have also heretofore been proposed various light beam scanning recording apparatuses wherein a photosensitive material is scanned with a light beam modulated with image signals, and an image which the image signals represent is recorded on the photosensitive material.

It is often desired that the image read out from the image original be reproduced and recorded on a photosensitive material immediately after image read-out. For example, as disclosed in U.S. Pat. No. 4,258,264 and Japanese Unexamined Patent Publication No. 56(1981)-11395, the applicant proposed a radiation image recording and reproducing system wherein a sheet provided with a layer of the stimulable phosphor (hereinafter referred to as a stimulable phosphor sheet) is first exposed to a radiation passing through an object such as the human body to have a radiation image of the object stored thereon, and is then exposed to stimulating rays such as a laser beam which cause the stimulable phosphor sheet to emit light in proportion to the stored radiation energy. The light emitted by the stimulable phosphor sheet upon stimulation thereof is photoelectrically detected and converted to electric image signals, and the radiation image of the object is reproduced as a visible image by use of the image signals on a recording medium such as a photographic film, a display device such as a cathode ray tube (CRT), or the like. In the proposed radiation image recording and reproducing system, in order to urgently make a diagnosis of the object, it is desired to obtain a hard copy of the reproduced image immediately after the radiation image recording is carried out. The same thing is desired also in the case of a copying machine proposed in recent years wherein, instead of optically exposing an electrophotographic photosensitive material, an image original is photoelectrically read out to obtain image signals, and the image on the image original is reproduced and recorded by use of the image signals.

The aforesaid requirement can be satisfied by using the light beam scanning read-out apparatus and the light beam scanning recording apparatus. However, in this case, since both the light beam scanning read-out apparatus and the light beam scanning recording apparatus must be provided, system cost and running cost become high and a large space is necessary for installation of the system.

In order to eliminate the aforesaid problems, it has been proposed, for example, in Japanese Unexamined Patent Publication No. 58(1983)-184677, to constitute an apparatus so that a light source for emitting a light beam is used commonly for image read-out and image recording, modulation of the light beam is ceased in the course of image read-out, and receiving of the light beam is intercepted in the course of image recording. However, with the proposed apparatus, image recording cannot be carried out until image read-out from a single image original is completed, and therefore the time required from image read-out to image reproduction or recording becomes very long.

SUMMARY OF THE INVENTION

The primary object of the present invention is to provide an image read-out and recording apparatus which is small and cheap, and has low running costs.

Another object of the present invention is to provide an image read-out and recording apparatus constituted to almost simultaneously carry out image read-out and image recording.

The present invention provides an image read-out and recording apparatus comprising:

(i) a light source for emitting a light beam, (ii) a light beam splitting means (such as a semi-transparent mirror or a beam splitter) for splitting said light beam into a read-out beam and a recording beam, (iii) a common light deflector for deflecting said read-out beam and said recording beam, (iv) a read-out sub-scanning means for moving an image original, which is disposed at a position at which the deflected read-out beam impinges, with respect to said light deflector in a direction at an angle with respect to a direction of main scanning effected by said deflection, (v) a light detection means for photoelectrically detecting light reflected by said image original, light passing through said image original, or light emitted by said image original when said image original is exposed to said read-out beam, and generating image signals representing an image recorded on said image original, (vi) a modulation means for modulating said recording beam on the basis of said image signals, and (vii) a recording sub-scanning means for moving a photosensitive material, which is disposed at a position at which the deflected recording beam impinges, with respect to said light deflector in a direction at an angle with respect to the direction of main scanning effected by said deflection.

With the image read-out and recording apparatus in accordance with the present invention wherein the light source for emitting the light beam and the light deflector are provided commonly for image read-out and image recording, the apparatus can be made small and cheap, and the running cost of the apparatus becomes low. Also, since image read-out and image recording can be carried out almost simultaneously, it becomes possible to very quickly reproduce the image recorded on the image original.

As understood from the specification, it should be noted that "moving an image original or a photosensitive material with respect to a light deflector" means movement of the image original or the photosensitive material relative to the light deflector and includes both the movement of the image original or the photosensitive material with the light deflector stationary and the movement of the light deflector with the image original or the photosensitive material stationary.

BRIEF DESCRIPTION OF THE DRAWING

The single drawing is a schematic view showing an embodiment of the image read-out and recording apparatus in accordance with the present invention.

DESCRIPTION OF THE PREFERRED EMBODIMENTS

The present invention will hereinbelow be described in further detail with reference to the accompanying drawing.

The drawing shows a embodiment of the image read-out and recording apparatus in accordance with the present invention, which is constituted to read out a radiation image from a stimulable phosphor sheet carrying the radiation image stored thereon, and to produce the read-out radiation image as a visible image on a photosensitive material. A stimulable phosphor sheet 10 carrying a radiation image of an object stored thereon by being exposed to radiation passing through the object is conveyed by a sheet conveyance means 11 constituted by an endless belt or the like in a sub-scanning direction as indicated by the arrow Y. Also, a laser beam 13 emitted by a laser beam source 12 constituted by a He—Ne laser, a semiconductor laser or the like is made to impinge upon a semi-transparent mirror 20 to function light beam splitting mechanism. The beam diameter of a read-out beam 13R passing through the semi-transparent mirror 20 is adjusted by a beam expander 21, and the read-out beam 13R is made to impinge upon a light deflector (polygon mirror) 14. The read-out beam 13R is deflected by the light deflector 14, passes through a converging lens (normally an fθ lens) 15 and a semi-transparent mirror 16, and scans the stimulable phosphor sheet 10 in a main scanning direction X approximately normal to the sub-scanning direction Y. As the stimulable phosphor sheet 10 is exposed to the read-out beam 13R in this manner, the exposed portion of the sheet 10 emits light 17 in an amount proportional to the stored radiation energy. The emitted light 17 is guided by a light guide member 18, and photoelectrically detected by a photomultiplier 19.

The light guide member 18 is made by forming a light guiding material such as an acrylic plate, and has a linear light input face 18a positioned to extend along the beam scanning line on the stimulable phosphor sheet 10, and a ring-shaped light output face 18b closely contacted with a light receiving face of the photomultiplier 19. The emitted light 17 entering the light guide member 18 from its light input face 18a is guided through total reflection inside of the light guide member 18, emanates from the light output face 18b, and is received by the photomultiplier 19. In this manner, the amount of the emitted light 17 carrying the radiation image information is detected by the photomultiplier 19. Analog output signals S generated by the photomultiplier 19 are fed to a read-out circuit 40 which carries out processing such as amplification and A/D conversion and generates digital image signals Sd. The digital image signals Sd represent the amount of the emitted light 17, i.e. the radiation image stored on the stimulable phosphor sheet 10. The image signals Sd are then subjected to a processing such as a frequency response emphasis processing or a gradation processing in an image processing circuit 41, and sent to and stored in a buffer memory 42.

A read-out beam 13R' split by the semi-transparent mirror 16 passes through a grid 22, is guided by a light guide bar 23, and is detected by photodetectors 24 and 25 closely contacted with the ends of the light guide bar 23. As the read-out beam 13R' passes through the grid 22, the amount of the read-out beam 13R' detected by the photodetectors 24 and 25 changes periodically. The changes in the amount of the read-out beam 13R' are related to the main scanning position of the read-out beam 13R on the stimulable phosphor sheet 10. Therefore, a synchronizing signal Ss representing the scanning position can be obtained by processing the outputs of the photodetectors 24 and 25 in a signal processing circuit 26. The synchronizing signal Ss is sent to the read-out circuit 40 and utilized for synchronizing signal read-out with beam scanning and for determining the start timing of beam scanning in the main scanning direction.

Reproduction and recording of the radiation image based on the read-out image signals Sd obtained in the manner as mentioned above will be described hereinbelow. A part of the laser beam 13 emitted by the laser beam source 12 is reflected by the semi-transparent mirror 20 and utilized as a recording beam 13W. The recording beam 13W is reflected by a mirror 50 to a light modulator 51 which modulates the recording beam 13W in the manner as mentioned later and which is constituted by an acousto-optic modulator (AOM), an electro-optic modulator (EOM), or the like. The beam diameter of the recording beam 13W is adjusted by a beam expander 52, and is made to impinge upon the aforesaid light deflector 14. The recording beam 13W is deflected by the light deflector 14, converged by a converging lens (normally an fθ lens) 53, and made to scan a photosensitive material 55 in a main scanning direction as indicated by the arrow x. The photosensitive material 55 is conveyed by a photosensitive material conveyance means 56 constituted by an endless belt or the like in a sub-scanning direction as indicated by the arrow y approximately normal to the main scanning direction x. In this manner, sub-scanning with the recording beam 13W is carried out and, as a result, the photosensitive material 55 is two-dimensionally scanned by the recording beam 13W.

Modulation of the recording beam 13W by the light modulator 51 is effected on the basis of the image signals Sd. The image signals Sd are stored in the buffer memory 42 in units of, for example, several main scanning lines, read out from the buffer memory 42 in units of a single main scanning line, and utilized for modulation of the recording beam 13W. Since the recording beam 13W is modulated on the basis of the image signals Sd in this manner, an image which the image signals Sd represent, i.e. the image stored on the stimulable phosphor sheet 10, is reproduced and recorded on the photosensitive material 55 scanned with the recording beam 13W. As new image signals Sd obtained by the aforesaid image read-out are sent to and stored in units of a single main scanning line, the image signals Sd which have been stored in the buffer memory 42 are read out therefrom in units of a single main scanning line. Therefore, the buffer memory 42 need only be of a small capacity capable of storing the image signals Sd only at several main scanning lines as mentioned above. Also, since image recording can be carried out by utilizing the image signals Sd almost immediately after the image signals Sd are obtained by the image read-out, the image read-out and the image recording can be achieved almost simultaneously with only a time interval which is approximately equal to the time required for the image processing in the image processing circuit 41 intervening therebetween.

In the aforesaid embodiment, a polygon mirror is used as the light deflector 14, and is fabricated so that each read-out beam reflecting surface and each recording beam reflecting surface of the polygon mirror form an angle with respect to each other, and the deflected read-out beam 13R and the deflected recording beam 13W are distributed in approximately opposite directions, i.e. downwardly and upwardly in the drawing. However, the light deflector need not necessarily be fabricated in this manner, and the read-out beam 13R and the recording beam 13W may be distributed in directions different from each other by the utilization of, for example, a mirror. Also, besides the polygon mirror, a galvanometer mirror or a hologram scanner may be used as the light deflector 14. Further, besides the semi-transparent mirror 20, a polarization beam splitter or the like may be used as the light beam splitting means for splitting the light beam emitted by a common light source into the read-out beam and the recording beam. The light detection means is not limited to the photomultiplier, and a semiconductor line sensor or the like may be used for this purpose.

Though the aforesaid embodiment is constituted to read out the radiation image stored on the stimulable phosphor sheet 10 and to reproduce and record the radiation image as a visible image, the image read-out and recording apparatus of the present invention is not limited to said application and is applicable also to the aforesaid copying machine.

I claim:

1. An image read-out and recording apparatus comprising:
   (i) a light source for emitting a light beam,
   (ii) a light beam splitting means for splitting said light beam into a read-out beam and a recording beam,
   (iii) a common light deflector for deflecting said read-out beam and said recording beam to produce a deflected read-out beam and a deflected recording beam, respectively,
   (iv) a read-out sub-scanning means for moving an image original, which is disposed at a position at which the deflected read-out beam impinges, with respect to said light deflector in a direction at an angle with respect to a direction of main scanning effected by said deflected read-out beam,
   (v) a light detection means for photoelectrically detecting light reflected by said image original, light passing through said image original, or light emitted by said image original when said image original is exposed to said read-out beam, and generating image signals representing an image recorded on said image original,
   (vi) a modulation means for modulating said recording beam on the basis of said image signals, and
   (vii) a recording sub-scanning means for moving a photosensitive material, which is disposed at a position at which the deflected recording beam impinges, with respect to said light deflector in a direction at an angle with respect to the direction of main scanning effected by said deflected read-out beam,
   wherein said apparatus further comprises means for forming an additional beam from said deflected read-out beam by splitting said deflected read-out beam, and a means for detecting the amount of said additional beam for generating a synchronizing signal representing a scanning position of said deflected read-out beam on said image original with respect to said main scanning direction.

2. An apparatus as defined in claim 1 wherein said image original is a stimulable phosphor sheet carrying a radiation image stored thereon, and said light detection means detects light emitted by said stimulable phosphor sheet in proportion to the stored radiation energy upon exposure to stimulating rays as said read-out beam.

3. An apparatus as defined in claim 1 wherein said light beam is a laser beam.

4. An image read-out and recording apparatus comprising:
   (i) a light source for emitting a light beam,
   (ii) a light beam splitting means for splitting said light beam into a read-out beam and a recording beam, said read-out beam and said recording beam travelling along respective optical paths,
   (iii) a read-out sub-scanning means for moving an image original, which is disposed in the optical path of the read-out beam at an angle with respect to a direction of main scanning effected by said read-out beam,
   (iv) a light detection means for photoelectrically detecting light reflected by said image original, light passing through said image original, or light emitted by said image original when said image original is exposed to said read-out beam, and generating image signals representing an image recorded on said image original,
   (v) a modulation means for modulating said recording beam on the basis of said image signals, and
   (vi) a recording sub-scanning means for moving a photosensitive material, which is disposed in the optical path of the recording beam, in a direction at an angle with respect to the direction of main scanning effected by said read-out,
   wherein said apparatus further comprises means for forming an additional beam from said read-out beam, and a means for detecting the amount of said additional beam for generating a synchronizing signal representing a scanning position of said read-out beam on said image original with respect to said main scanning direction.

* * * * *